(12) United States Patent
Lin

(10) Patent No.: US 9,239,638 B2
(45) Date of Patent: Jan. 19, 2016

(54) INFORMATION PROCESSING DEVICE SUPPORTING SUSPENSION OPERATION FUNCTION, DATA PROCESSING METHOD THEREOF, INPUT DEVICE AND INPUT CONTROLLING METHOD THEREOF

(71) Applicant: Lenovo (Beijing) Co., Ltd., Haidian District. Beijing (CN)

(72) Inventor: Luming Lin, Beijing (CN)

(73) Assignee: LENOVO (BEIJING) CO., LTD., Haidian District, Beijing (CN)

( * ) Notice: Subject to any disclaimer, the term of this patent is extended or adjusted under 35 U.S.C. 154(b) by 46 days.

(21) Appl. No.: 14/230,094

(22) Filed: Mar. 31, 2014

(65) Prior Publication Data

US 2015/0091878 A1    Apr. 2, 2015

(30) Foreign Application Priority Data

Sep. 29, 2013 (CN) .......................... 2013 1 0455341

(51) Int. Cl.
*G06F 3/033* (2013.01)
*G06F 3/0354* (2013.01)
(52) U.S. Cl.
CPC ............ *G06F 3/03545* (2013.01); *G06F 3/033* (2013.01); *G06F 2203/04101* (2013.01)
(58) Field of Classification Search
CPC ................ G06F 3/03545; G06F 3/033; G06F 2203/04101; G06F 2203/04108

USPC .......................................................... 345/179
See application file for complete search history.

(56) References Cited

U.S. PATENT DOCUMENTS 8,780,072 B2 * 7/2014 Oda ..................... G06F 3/03545
178/18.05
2012/0062520 A1 * 3/2012 Knee ............................ 345/179

FOREIGN PATENT DOCUMENTS

DE         EP0242598 A2 * 10/1987 .............. G06F 3/033

* cited by examiner

*Primary Examiner* — Larry Sternbane
(74) *Attorney, Agent, or Firm* — Brinks Gilson & Lione; G. Peter Nichols

(57) ABSTRACT

An information processing device, a data processing method thereof, an input device, and an input controlling method are described. The information processing device is capable of responding to an input operation of an input device, and the input device includes an input component located at end portion thereof. The information processing device includes a sensing module capable of sensing a position of the input component with respect to the sensing module when the distance between the input component and the sensing module satisfies a first predetermined condition, a first controlling module judging whether the information processing device satisfies a second predetermined condition when the distance satisfies the first predetermined condition, responds to an input operation corresponding to the position of the input component with respect to the sensing module when the information processing device satisfies the second predetermined condition, or otherwise, does not respond thereto.

11 Claims, 2 Drawing Sheets

INFORMATION PROCESSING DEVICE SUPPORTING SUSPENSION OPERATION FUNCTION, DATA PROCESSING METHOD THEREOF, INPUT DEVICE AND INPUT CONTROLLING METHOD THEREOF

BACKGROUND

This application claims priority to Chinese patent application No. 201310455341.3 filed on Sep. 29, 2013, the entire contents of which are incorporated herein by reference.

The present invention relates to an information processing device, a data processing method applied to the information processing device, an input device and an input controlling method applied to the input device.

Nowadays, an input device such as stylus is widely used with information processing devices such as a tablet computer, and suspension operation function to the input device can be supported by most information processing devices. The suspension operation function enables a user to achieve a specific operation with the input device such as stylus without touching the screen of the information processing device. However, with the suspension operation function, a problem is that the stylus may easily be triggered by mistake. For example, an undesired suspension operation may easily to be generated when instead of using the stylus, the user instead directly places the stylus horizontally on the surface of the screen. At this moment, the distance from the stylus to the screen is within the range of suspension operation distance, and a suspension operation not desired by the user is generated. And, a mistaken operation such as cursor drifting may even be generated.

To solve the above problem, conventionally, a valid suspension operation distance is reduced; however, as the stylus is made to be smaller and smaller, this solution has a limitation, and may affect the user's operation experience.

SUMMARY

The present invention is made in view of the above issues, and an object thereof is to provide an information processing device, a data processing method applied to the information processing device, an input device and an input controlling method applied to the input device that can decrease or eliminate the occurrence of situation where the input device such as stylus is triggered by mistake without affecting user's operation experience, in the information processing device which supports the suspension operation function.

According to one aspect of the invention, there is provided a data processing method for an information processing device. The information processing device includes a sensing module which is capable of sensing a position of an input component of an input device with respect to the sensing module when the distance between the input component and the sensing module satisfies a first predetermined condition which is larger than or equal to N and smaller than or equal to M. The input component is located at end portion of the input device, N and M are two different distances within sensing range of the sensing module, and N>0. The data processing method includes: judging whether the information processing device satisfies a second predetermined condition when the distance between the input component and the sensing module satisfies the first predetermined condition; responding to an input operation corresponding to the position of the input component with respect to the sensing module when the information processing device satisfies the second predetermined condition; and not responding to the input operation corresponding to the position of the input component with respect to the sensing module when the information processing device does not satisfy the second predetermined condition.

According to another aspect of the invention, there is provided an input controlling method for an input device. The input device is capable of performing an input operation on an information processing device, and the information processing device is capable of responding to the input operation of the input device. The input device includes an input component located at end portion thereof, and the information processing device includes a sensing module which is capable of sensing a position of the input component with respect to the sensing module when the distance between the input component and the sensing module satisfies a first predetermined condition which is larger than or equal to N and smaller than or equal to M, wherein N and M are two different distances within sensing range of the sensing module, and N>0. The input controlling method comprises performing detection on the input device, and generating detection information on the input device; and judging whether an input state of the input device is in valid state or invalid state based on the detection information, and generating the first state information on the input state of the input device, wherein the first state information is used for judging whether the information processing device responds to the input operation of the input device.

According to still another aspect of the invention, there is provided an information processing device. The information processing device is capable of responding to an input operation of an input device, and the input device includes an input component located at end portion thereof. The information processing device includes: a sensing module which is capable of sensing a position of the input component with respect to the sensing module when the distance between the input component of the input device and the sensing module satisfies a first predetermined condition which is larger than or equal to N and smaller than or equal to M, wherein N and M are two different distances within sensing range of the sensing module, and N>0; and a first controlling module judging whether the information processing device satisfies a second predetermined condition when the distance between the input component and the sensing module satisfies the first predetermined condition, responding to an input operation corresponding to the position of the input component with respect to the sensing module when the information processing device satisfies the second predetermined condition, and not responding to the input operation corresponding to the position of the input component with respect to the sensing module when the information processing device does not satisfy the second predetermined condition.

According to still another aspect of the invention, there is provided an input device. The input device is capable of performing an input operation on an information processing device, the information processing device being capable of responding to the input operation of the input device, and the information processing device comprises a sensing module. The input device comprises: an input component located at end portion of the input device, wherein the sensing module is capable of sensing a position of the input component with respect to the sensing module when the distance between the input component and the sensing module satisfies a first predetermined condition which is larger than or equal to N and smaller than or equal to M, wherein N and M are two different distances within sensing range of the sensing module, and N>0; a detection module performing detection on the input device, and generating detection information on the input device; and a second controlling module judging whether an input state of the input device is in valid state or invalid state based on the detection information, and generating the first state information on the input state of the input device, wherein the first state information is used for judging whether the information processing device responds to the input operation of the input device.

The information processing device according to the invention, the data processing method for the information processing device, the input device and the input controlling method for the input device can decrease or eliminate the occurrence of situation where the input device such as stylus is triggered by mistake without affecting user's operation experience, in the information processing device which supports the suspension operation function.

DETAILED DESCRIPTION

Figure 1:
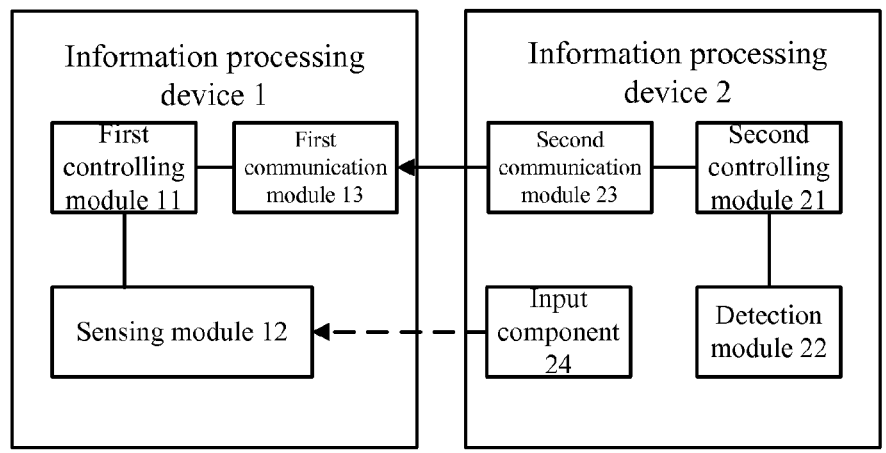
FIG. 1 is a functional block diagram showing an information processing device 1 and an input device 2 according to a first embodiment.

Specific embodiments according to the present invention will be described in details with reference to the appended drawings. It should be noted herein that, in the drawings, the same reference numbers will be given to components with substantially the same or like structures and functions, and repeated description thereof will be omitted.

First of all, an explanation will be made to the information processing device of the invention. The information processing device of the invention can respond to the input operation of the input device. The input device includes an input component which is located at end portion thereof. The information processing device includes a sensing module and a first controlling module. When the distance between the input component and the sensing module satisfies a first predetermined condition, which is larger than or equal to N and smaller than or equal to M, the sensing module can sense a position of the input component with respect to the sensing module. Here, N and M are two different distances within the sensing range of the sensing module, and N>0. The first controlling module judges whether the information processing device satisfies a second predetermined condition when the distance between the input component and the sensing module satisfies the first predetermined condition, responds to an input operation corresponding to the position of the input component with respect to the sensing module when the information processing device satisfies the second predetermined condition, and does not respond to the input operation corresponding to the position of the input component with respect to the sensing module when the information processing device does not satisfy the second predetermined condition.

Herein, the information processing device of the present invention is an information processing device such as cell phone, tablet computer and the like, and receives an input operation from the input component of the input device and responds thereto. The information processing device of the invention can support the suspension operation function of the input device. That is, in case where the distance between the input component of the input device and the sensing module is larger than 0 and smaller than a maximum sensing distance, the sensing module in information processing device of the invention can also sense the position of the input component with respect to the sensing module, and thereby a response is performed by the information processing device to the input operation at the distance which is larger than 0 and smaller than the maximum sensing distance, so as to achieve the suspension operation function. Therefore, the sensing module of the information processing device of the present invention can sense the position of the input component with respect to the sensing module within the sensing range (the distance between the input device and the sensing module is larger than or equal to 0 and smaller than the maximum sensing distance).

And "responding to" the input operation corresponding to the position of the input component with respect to the sensing module means: the information is processed in the information processing device with the position information of the input component with respect to the sensing module.

Further, in the information processing device of the invention, only when the distance between the input component and the sensing module is larger than or equal to N and smaller than or equal to M, a judgment as to whether the second predetermined condition is satisfied is performed, where N and M are two different distances within the sensing range of the sensing module and N>0. Here, N and M can be any value within the sensing range of the sensing module, as long as the expression of M>N can be guaranteed. Further, in case of N=0 (that is, the input component is in contact with the sensing module), a judgment as to whether the second predetermined condition is satisfied can be also performed. And it is also possible to perform the judgment as whether the second predetermined condition is satisfied as long as the position of the input component with respect to the sensing module is sensed by the sensing module.

In the information processing device of the invention, the first controlling module judges whether the second predetermined condition is satisfied, and determines whether to respond to the input operation of the input component according to this judgment result. This second predetermined condition can be condition as to whether the input device is held, condition as to angle of the input device with respect to the vertical direction, condition as to the position relationship of the input device with respect to the information processing device and the like, and this invention is limited to the above exemplified conditions and can be any condition, as long as the occurrence of the situation in which the input device is triggered by mistake can be decreased or eliminated.

Hereinafter, the technical solution of the invention will be explained by referring to specific embodiments.

First Embodiment

In the first embodiment of the invention, an information processing apparatus receives first state information as to whether input state of the input device is in valid or invalid state from the input device and judges whether the second predetermined condition is satisfied according to the first state information.

FIG. 1 shows a functional block diagram of an information processing device 1 and an input device 2 according to the first embodiment of the invention. As shown in FIG. 1, the information processing device 1 includes a first controlling module 11, a sensing module 12 and a first communication module 13, and the input device 2 includes a second controlling module 21, a detection module 22, a second communication module 23 and an input component 24.

In the input device 2, the user performs the input operation on the information processing device 1 through the input component 24. The sensing module 12 of the information processing device 1 can sense the position of the input component 24 with respect to the sensing module.

The detection module 22 performs detection on the input device 2, and generates detection information about the input device 2. The second controlling module 21 judges whether the input state of the input device 2 is in valid state or invalid state based on the detection information, and generates the first state information about the input state of the input device 2. The second communication module transmits the first state information generated by the second controlling module 21 to the information processing device 1.

Particularly, for example, in case where the detection module 22 is constituted by one or more touch sensors used to detect whether the input device 2 is touched, the detection module 22 can generate the first detection information associated with whether the input device 2 is held. The first detection information represents whether it is touched in one or more touch sensors, for example. Based on the first detection information, the second controlling module 21 judges whether the input device is held by the user, and generates the first state information representing whether the input device 2 is held based on the judgment result. In case where it is judged based on the first detection information that the input device 2 is held by the user, the second controlling module 21 generates the first state information representing the input device 2 is held. Correspondingly, in case where the first detection information judges based on the first detection information that the input device 2 is not held by the user, the second controlling module 21 generates the first state information representing the input device 2 is not held. Herein, one or more touch sensors are arranged such that in case where the user holds the input device 2, a case where the input device is held by the user can be judged by the detection module 22 and the second controlling module. For example, preferably, the touch sensor is arranged at a contact position where the user holds the input device 2.

Particularly, for example, in case where the detection module 22 is constituted by an acceleration sensor for detecting the angle of the input device 2 with respect to the vertical direction (gravity acceleration direction), the detection module 22 can generate second detection information about the angle of the input device 2 with respect to the vertical direction. Based on the second detection information, the second controlling module 21 judges whether this angle exceeds a threshold value, and generates the first state information representing that whether the angle of the input device 2 with respect to the vertical direction exceeds the threshold value based on the judgment result. In case where the second controlling module 21 judges, based on the second detection information, that the angle of input device 2 with respect the vertical direction exceeds the preset threshold value, the first state information representing that the angle exceeds the threshold value is generated. Correspondingly, in case where the second controlling module 21 judges, based on the second detection information, that the angle of input device 2 with respect the vertical direction does not exceed the preset threshold value, the first state information representing that the angle does not exceed the threshold value is generated. Herein, this threshold value can be properly set in accordance with the angle of the input device 2 with respect to the information processing device 2 when the user generally performs input on the information processing device 1 with the input device 2, which for example can be set to be 40° or can be set to be any other suitable angles.

In addition to whether the input device 2 is held, whether the angle of the input device 2 with respect to the vertical direction exceeds the threshold value, the first state information can represent some other meanings, as long as it can represent whether the input state of the input device is in valid state or invalid state. For example, in addition to the touch sensor, the detection module 22 includes an acceleration sensor. In this case, the first state information generated by the second controlling module 21 based on the detection information represents, in addition to whether the input device is held, whether the angle of the input device 2 with respect to the vertical direction exceeds the threshold value.

In the information processing device 1, in a case where the distance between the input component 24 of the input device 2 and the sensing module 12 is within the sensing range, the sensing module 12 can sense a position of the input component 24 with respect to the sensing module 24. Herein, in the information processing device supporting suspension operation of the input device 2, in case where the distance between the input component 24 and the sensing module 12 is larger than 0 and smaller than the maximum sensing distance, the sensing module 12 can also sense the position of the input component 24 with respect to the sensing module 12. Therefore, the sensing range of the sensing module 12 is: the distance between the input component 24 and the sensing module 12 is larger than or equal to 0 and smaller than the maximum sensing distance. Therefore, when the distance between the input component 24 of the input device 2 and the sensing module 12 is larger than or equal to N and smaller than or equal to M, the sensing module 12 can also sense the position of the input component 24 with respect to the sensing module 12. Herein, M and N are two different distances within the sensing range of the sensing module 12 and N>0, and the expression of M>N is certainly satisfied.

When the distance between the input component 24 and the sensing module 12 is larger than or equal to N and smaller than or equal to M, the first controlling module 11 judges whether the information processing device 1 satisfies the second predetermined condition; when the information processing device 1 satisfies the second predetermined condition, the first controlling module 11 responds to an input operation corresponding to the position of the input component 24 with respect to the sensing module 12; when the information processing device 1 does not satisfy the second predetermined condition, the first controlling module 11 does not respond to an input operation corresponding to the position of the input component 24 with respect to the sensing module 12. However, as described above, the first controlling module 11 may as well perform the process of judging whether the information processing device 1 satisfies the second predetermined condition as long as the sensing module 12 senses the position of the input component 24 with respect to the sensing module 12.

In the first embodiment, the information processing device 1 further includes a first communication module 13. The first communication module 13 receives the first state information about the input device 2 from the input device 2. In case where the first state information from the input device 2 is received by the first communication module 13, the first controlling module 11 judges whether the information processing device 1 satisfies the second predetermined condition based on the first state information received by the first communication module 13.

Particularly, as described above, in case where the detection module 22 is constituted by one or more touch sensors and detects whether the input device 2 is held, whether the input device 2 is held is represented by the first state information received by the first communication module 13. In this case, the first controlling module 11 judges that the information processing device 1 satisfies the second predetermined condition in case where the first state information represents that the input device 2 is held, and judges that the information processing device 1 does not satisfy the second predetermined condition in case where the first state information represents that the input device 2 is not held.

Particularly, as described above, in case where the detection module 22 is constituted by the acceleration sensor for detecting the angle of the input device 2 with respect to the vertical direction and detects the angle, whether the angle of the input device 2 with respect to the vertical direction exceeds the threshold value is represented by the first state information received by the first communication module 13. In this case, the first controlling module 11 judges that the information processing device 1 satisfies the second predetermined condition in case where the first state information represents that the angle of the input device 2 with respect to the vertical direction does not exceed the threshold value, and judges that the information processing device 1 does not satisfy the second predetermined condition in case where the first state information represents that the angle of the input device 2 with respect to the vertical direction exceeds the threshold value.

Further, as described above, in addition to representing whether the input device 2 is held and whether the angle of the input device 2 with respect to the vertical direction exceeds the threshold value, the first state information can represent some other meanings, as long as it can represent whether the input state of the input device is in valid state or invalid state. In case where the first state information received by the first controlling module 13 represents other meanings, the first controlling module 11 can also adaptively judge whether the information processing device 1 satisfies the second predetermined condition in accordance with the first state information representing other meaning.

Second Embodiment

In the information processing device 1 of the invention, the first controlling module 11 can also judge the position relationship of the input device 2 with respect to the information processing device 1, and judge whether the information processing device 2 satisfies the second predetermined condition based on the position relationship. Herein, in the information processing device 1, the position relationship of the information processing device 1 with respect to the input device 2 can be judged or calculated by any module (for example, image acquisition module, sensing module) with any method, as long as the obtained position relationship can be used to the process of judging whether the information processing device 2 satisfies the second predetermined condition.

In the second embodiment, the sensing module 12 of the information processing device 1 is employed to judge the position relationship of the information processing device 1 with respect to the input device 2, and judge whether the information processing device 1 satisfies the second predetermined condition based on the position relationship.

Figure 2:
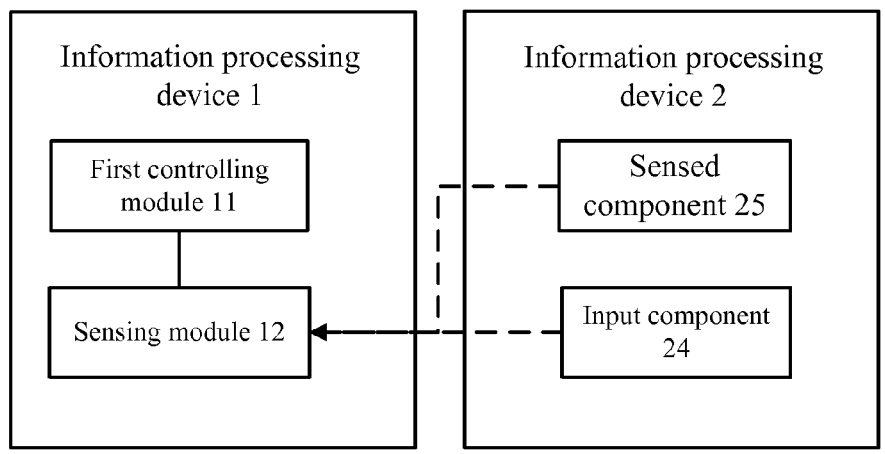
FIG. 2 is a functional block diagram showing an information processing device 1 and the input device 2 according to a second embodiment.

FIG. 2 shows a functional block diagram of the information processing device 1 and the input device 2 according to the embodiment of the invention. As shown in FIG. 2, the information processing device 1 includes a first controlling module 11 and a sensing module 12; and the input device 2 comprises a sensed component 25, in addition to an input component 24 located at end portion thereof.

In the input device 2, the position of the sensed component 25 in the input device 2 is different from the position of the input component 24 in the input device 2, and can be, for example, arranged at another end portion of the input device 2, or arranged at any position of the input device other than the end portion thereof.

As described above, the sensing module 12 can sense the position of the input component 24 with respect to the sensing module 12 in case where the distance between the input component 24 of the input device 2 and the sensing module 12 is within the sensing range.

Likewise, the sensing module 12 can sense the position of the sensed component 25 with respect to the sensing module 12 in case where the distance between the sensed component 25 of the input device 2 and the sensing module 12 is within the sensing range. Further, the sensing range of the sensing module 12 for the sensed component 25 also is: the distance between the sensed component 25 and the sensing module 12 is larger than or equal to 0 and smaller than the maximum sensing distance. Therefore, the sensing module 12 can also sense the position of the sensed component with respect to the sensing module 12 when the distance between the sensed component 25 of the input device 2 and the sensing module 12 is larger than or equal to N and smaller than or equal to M. Herein, M and N are two different distances within the sensing range of the sensing module 12, and N>0.

Herein, the sensed component 25 can be one with input function or without input function. In other words, in the information processing device 1, it is possible to respond to the position of the sensed component with respect to the sensing module 12 so as to perform information processing with this position information, and it is also possible not to respond to the position of the sensed component 25 with respect to the sensing module 12 and only use it to judge whether the information processing device 1 satisfies the second predetermined condition.

In case where the sensing module 12 senses the position of the input component 24 with respect to the sensing module and the distance between the input component 24 and the sensing module 12 is larger than or equal to N and smaller than or equal to M, the first controlling module 11 judges whether the sensing module 12 further senses the position of the sensed component 25 with respect to the sensing module 12. In case where the sensing module 12 does not sense the position of the sensed component 25 with respect to the sensing module 12, it is judged that the information processing device 1 satisfies the second predetermined condition, and in case where sensing module 12 further senses the position of the sensed component 25 with respect to the sensing module 12, it is judged that the information processing device 1 does not satisfy the second predetermined condition.

Particularly, for example, the sensing parameters of the input component 24 and the sensed component 25 in the input device 2 are set to be different. In this case, if the sensed component 25 is one without the input function, when the sensing module 12 only senses the position of the input component 24 with respect to the sensing module 12, the information processing device 1 responds to the input operation corresponding to the position of the input component 24 with respect to the sensing module 12; when the sensing module 12 only senses the position of the sensed component 25 with respect to the sensing module 12, the information processing device 1 does not respond to the input operation corresponding to the position of the sensed component 25 with respect to the sensing module 12; when the sensing module 12 senses two positions of both the input component 24 and the sensed component 25 with respect to the sensing module 12, the first controlling module 11 judges that the information processing device 1 does not satisfies the second predetermined condition, and thus does not respond to the input operation corresponding to the position of the input component 24 with respect to the sensing module 12.

In case where the sensing parameters of the input component 24 and the sensed component 25 in the input device 2 are set to be different, if the sensed component 25 is one with input function, when the sensing module 12 only senses the position of the input component 24 with respect to the sensing module 12, the information processing device 1 responds to the input operation corresponding to the position of the input component 24 with respect to the sensing module 12; when the sensing module 12 only senses the position of the sensed component 25 with respect to the sensing module 12, the information processing device 1 responds to a second input operation corresponding to the position of the sensed component 25 with respect to the sensing module 12 which is different from the first input operation; when the sensing module 12 senses the two positions of both the input component 24 and the sensed component 25 with respect to the sensing module 12, the first controlling module 11 judges that the information processing device 1 does not satisfies the second predetermined condition, thus does not respond to the input operation corresponding to the position of the input component 24 with respect to the sensing module 12.

For another example, the sensing parameters of the input component 24 and the sensed component 25 in the input device 2 are set to be the same. In this case, the sensed component 25 is one with the input function. Therefore, when the sensing module 12 senses that the number of the position with respect to the sensing module 12 is one, the information processing device 1 responds to the input operation corresponding to this one position with respect to the sensing module 12, and when the sensing module 12 senses that the number of the position with respect to the sensing module 12 is two, the first controlling module 11 judges that the information processing device 1 does not satisfies the second predetermined condition, and thus does not respond to the input operation corresponding to the position of the input component 24 with respect to the sensing module 12.

Third Embodiment

Similarly to the second embodiment, in the third embodiment, the first controlling module 11 of the information processing device 1 of the invention can also judge the position relationship of the input device 2 with respect to the information processing device 1, and judge whether the information processing device 2 satisfies the second predetermined condition based on the position relationship.

In the third embodiment, the information processing device 1 includes an acquisition module, in addition to the first controlling module 11 and the sensing module 12. The acquisition module at least collects for the input device 2 so as to generate acquisition information for computing the position relationship of the input device 2 with respect to the information processing device 1. The first controlling module 11 computes the position relationship of the input device 2 with respect to the information processing device 1 based on the acquisition information and judges whether the information processing device 1 satisfies the second predetermined condition based on the calculated position relationship. Further, in the input device 2 of the third embodiment, it is sufficient to only include the input component 24.

Particularly, the acquisition module of the third embodiment is constituted by one or more cameras, for example, and acquires image information about the input device 2. The first controlling module 11 performs analysis on the image information acquired by the acquisition module, so as to compute the position relationship of the input device 2 and the information processing device 1, and to judge whether the information processing device 1 satisfies the second predetermined condition based on the calculated position relationship.

For example, in the information processing device 1, one camera constituting the acquisition module is arranged at lower part of the sensing module 12. In case where the sensing module 12 senses the position of the input component with respect to the sensing module 12, the camera can capture the input device 2 and acquire image data about the input device 2. For example, the sensing module 12 and a display module arranged with this sensing module are configured such that the light transmittance thereof satisfies a predetermine condition so that the camera can capture the input device 2. The first controlling module 11 obtains the image data, and performs analysis on the image data so as to obtain a length of the input device 2 displayed in the captured image data. If the length of the input device 2 displayed in the image data which is obtained in accordance with the image data exceeds the threshold value (which is two thirds of actual length of the input device 2 for example), the first controlling module 11 judges that the input device 2 parallels or substantially parallels with the information processing device 1, and if the length of the input device 2 displayed in the image data which is obtained in accordance with the image data is smaller than or equal to the threshold value, the first controlling module 11 judges that the input device 2 does not parallel with the information processing device 1. Furthermore, in case where the first controlling module 11 judges that the input device 2 parallels or substantially parallels with the information processing device 1, it is judged that the information processing device 1 does not satisfy the second predetermined condition, or otherwise, it is judged that information processing device 1 satisfies the second predetermined condition.

Further, it is also possible that a plurality of cameras are arranged at lower part of the sensing module 12, and in case where the sensing module 12 senses the position of the input component 24 with respect to the sensing module 12, the plurality of the cameras can capture the input device 2 and acquire a plurality of image data concerning the input device 2. In this case, the first controlling module performs analysis on the acquired image data so as to obtain the length of the input device 2 displayed in the captured image data.

For example, in the information processing device 1, the plurality of cameras constituting the acquisition module can also be configured such that the plurality of the cameras are configured at outside of the sensing module 12, and the plurality of the cameras are oriented to the surface of the sensing module 12 of the information processing device 1 and arranged to surround the sensing module 12. In case where the sensing module 12 senses the position of the input component with respect to the sensing module 12, the plurality of the cameras can capture the input device 2 and acquire a plurality of image data concerning the input device 2. The first controlling module 11 obtains the image data, and performs analysis on the image data so as to obtain the length of the input device 2 displayed in the captured image data. If the length of the input device 2 displayed in the image data which is obtained in accordance with the image data exceeds the threshold value (which is one half of the actual length of the input device 2 for example), the first controlling module 11 judges that the input device 2 parallels or substantially parallels with the information processing device 1, and if the length of the input device 2 displayed in the image data which is obtained in accordance with the image data is smaller than or equal to the threshold value, the first controlling module 11 judges that the input device 2 does not parallel with the information processing device 1. Furthermore, in case where the first controlling module 11 judges that the input device 2 parallels or substantially parallels with the information processing device 1, it is judged that the information processing device 1 does not satisfy the second predetermined condition, or otherwise, it is judged that information processing device 1 satisfies the second predetermined condition.

Hereinafter, explanation will be made to the input device of the invention.

The input device according to the invention can perform input operation on the information processing device, and the information processing device can respond to the input operation from the input device. The input device includes an input component, a detection module and a second controlling module. The input component is located at end portion of the input device, in which the sensing module of the information processing device can sense the position of the input component with respect to the sensing module when the distance between the input component and the sensing module satisfies a first predetermined condition which is larger than or equal to N and smaller than or equal to M. Herein, N and M are two different distances within the sensing range of the sensing module, and N>0. The detection module performs detection on the input device, and generates detection information concerning the input device. The second controlling module judges whether the input state of the input device is in valid state or invalid state based on the detection information, and generates the first state information on the input state of the input device which is employed to judge whether the information processing device responds to the input operation from the input device.

Herein, the input device of the invention refers to, for example, stylus performing input operation on the information processing device such as mobile phone, tablet computer and the like, and the information processing device can respond to the input operation of stylus and the like. The information processing device can support the suspension operation function of the input device of the invention. That is, the sensing module in the information processing device can also sense the position of the input component with respect to the sensing module in case where the distance of the input component of input device of the invention and the sensing module is larger than zero, so that the information processing device responds to the input operation at the distance being larger than zero, and thus to achieve the suspension operation function. The sensing module of the information processing device on which the input operation is performed by the input device of the present invention can sense the position of the input component with respect to the sensing module within the sensing range (the distance between the input device and the sensing module is larger than or equal to 0 and smaller than the maximum sensing distance).

Herein, in the input device of the invention, the input component 24 of the input device 2 explained in the first to the third embodiments can be made of materials which can be sensed by the sensing module 12, so that the position of the input component 24 with respect to the sensing module 12 can be sensed by the sensing module 12 of the information processing device 1. Further, the input component 24 can also be configured such that the signal is transmitted through the transmitting module contained in the input device, thus the sensing module 12 of the information processing device 1 can sense the position of the input component 24 with respect to the sensing module 12. In case where the input device 1 is configured such that the signal is transmitted through the transmitting module, if no signal is transmitted by the transmitting module, the sensing module 12 of the information processing device 1 can not sense the position of the input component 24 with respect to the sensing module 12.

In the first embodiment, a mode has been explained in which the detection is performed by the detection module 22 on the input device 2 and the detection information on the input device 2 is generated, and the second controlling module 21 judges whether the input state of the input device 2 is in valid state or invalid state based on the detection information (for example whether the input device 2 is held, whether the angle of the input device 2 with respect to the vertical direction exceeds a threshold value and the like), generates the first state information on the input state of the input device 2, and transmits the first state information to the information processing device 1 through the second communication module 23, and thus the information processing device 1 judges whether the information processing device 1 satisfies the second predetermined condition with the first state information.

Fourth Embodiment

Hereinafter, a mode will be explained with reference to the fourth embodiment in which control is performed with the generated first state information in the input device 2, so that the sensing module 12 of the information processing device 1 can or cannot sense the position of the input component 24 with respect to the sensing module.

In the input device 2 according to the fourth embodiment, the signal (such as infrared ray and the like) associated with the input operation of the input component 24 is transmitted through the transmitting module contained in the input device 2, so that the sensing module 12 of the information processing device 1 can sense the position of the input component 24 with respect to the sensing module 12.

In addition to the second controlling module 21, the input component 24 and the detection module 22, the input device 2 according to the fourth embodiment includes a transmitting module. The transmitting module transmits the signal associated with the input operation of the input component 24 to the information processing device 1.

The information processing device 1 includes a first controlling module 11 and a sensing module 12. The sensing module 12 can receive the signal transmitted from the transmitting module, so as to sense the position of the input component 24 with respect to the sensing module 12. That is, in case where no signal from the transmitting module is received, the sensing module 12 cannot sense the position of the input component 24 with respect to the sensing module 12.

The function and effect of the input component 24 and the detection module 22 in the input device 2 are same as those in the first embodiment, and will not be repeatedly explained. The second controlling module 21 also judges whether the input state of the input device 2 is in valid state or invalid state (for example whether the input device 2 is held, whether the angle of the input device 2 with respect to the vertical direction exceeds the threshold value and the like) based on the information detected by the detection module 22, and generates the first state information on the input state of the input device.

Furthermore, the second controlling module 21 controls the transmitting module to be capable of transmitting the signal associated with the input operation of the input component 24 in case where the first state information represents that the input state of the input device 2 is in valid state. Hence the sensing module 12 can sense the position of the input component 24 with respect to the sensing module 12. On the other hand, in case where the first state information represents that the input state of the input device 2 is in invalid state, the transmitting module is controlled to be not capable of transmitting the signal associated with the input operation of input component 24. Hence the sensing module 12 cannot sense the position of the input component 24 with respect to the sensing module 12.

Particularly, for example, in case where the first state information represents that the input device 2 is not held (or the angle of the input device 2 with respect to the vertical direction is smaller than the threshold value), the transmitting module is controlled to be capable of transmitting the signal associated with the input operation of the input component 24. On the other hand, in case where the first state information represents that the input device 2 is held (or the angle of the input device 2 with respect to the vertical direction is larger than the threshold value), the transmitting module is controlled to be not capable of transmitting the signal associated with the input operation of the input component 24.

Further, it is possible for the second controlling module 21 to control, by not supplying power to the transmitting module, the transmitting module to be not capable of transmitting the signal associated with the input operation of the input component 24. However, it is also possible for the second controlling module 21 to employ other methods to make the transmitting module fail to transmit the signal associated with the input operation of the input component 24.

In case where the information processing device supports the suspension operation function, the information processing device according to the invention and the input device performing the input operation on this information processing device can decrease or eliminate the occurrence of situation where the input device such as stylus is triggered by mistake without affecting user's operation experience.

Figure 3:
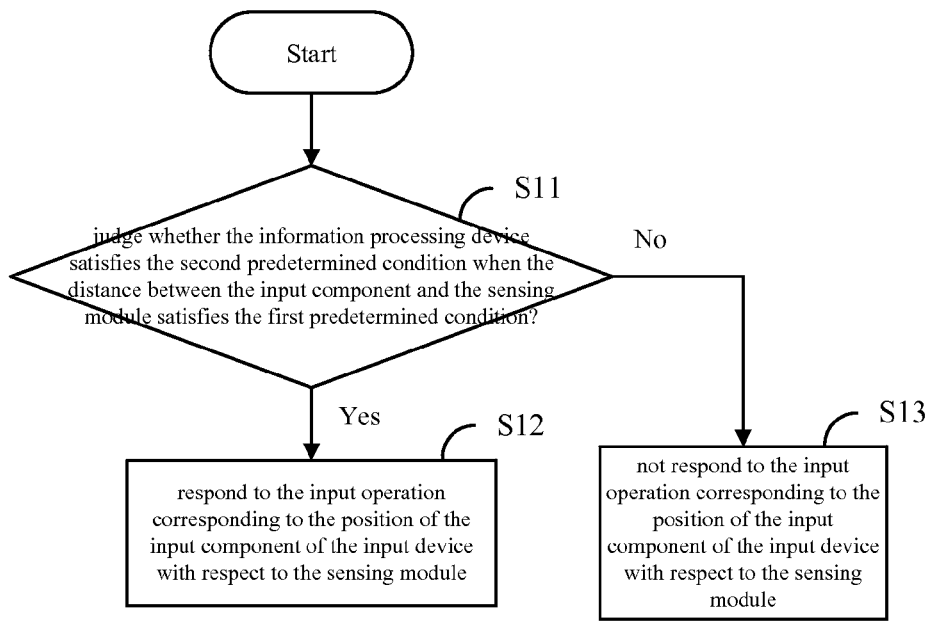
FIG. 3 is a flowchart showing a data processing method according to the present invention.

Hereinafter, an information processing method applied to the information processing device of the invention will be explained with reference to FIG. 3. FIG. 3 is a flowchart showing steps of the information processing method applied to the information processing device of the invention. The information processing device can respond to the input operation of the input device. The input device includes an input component which is located at end portion thereof. The information processing device includes a sensing module which can sense the position of the input component with respect to the sensing module within the sensing range (the distance between the input device and the sensing module is larger than or equal to 0 and is smaller than the maximum sensing distance). Therefore, when the distance between the input component of the input device and the sensing module satisfies the first predetermined condition which is larger than or equal to N and smaller than or equal to M, the sensing module can sense the position of the input component with respect to the sensing module.

In case where the sensing module of the information processing device senses the position of the input component with respect to the sensing module, the information processing method of the invention starts.

After that, at step S11, when the distance between the input component and the sensing module satisfies the first predetermined condition, whether the information processing device satisfies the second predetermined condition is judged. Here, the second predetermined condition can be a condition on whether the input device is held, a condition on the angle of the input device with respect to the vertical direction, a condition on the position relationship of the input device with respect to the information processing device and the like, and the present invention is not limited the above exemplified conditions, and can be any conditions, as long as the occurrence of situation in which the input device is triggered by mistake can be decreased or eliminated.

Particularly, as described in the first embodiment, the information processing device 1 includes the first communication module 13, and the first communication module 13 can receive the first state information on the input device 2 from the input device 2. Hence, Step 11 includes steps of receiving by the first communication module 13 the first state information on the input device 2 from the input device 2, and judging by the first controlling module 11 based on the first state information that whether the information processing device 1 satisfies the second predetermined condition. Here, the first state information can represent any meaning, as long as it can represent whether the input state of the input device is in valid state or invalid state.

For example, in the first embodiment, the input device 2 detects by the detection module 22 that whether the input device 2 is held and generates the first detection information associated with whether the input device is held, and judges by the second controlling module 21 based on the first detection information whether the input device 2 is held, so as to generate the first state information indicating whether the input device is held, and then transmits this first state information to the information processing device 1 through the second communication module 23. In this case, step S11 includes steps of judging that the information processing device 1 satisfies the second predetermined condition in case where the first state information indicates that the input device 2 is held, and judging that the information processing device 1 does not satisfy the second predetermined condition in case where the first state information indicates that the input device 2 is not held.

For another example, in the first embodiment, input device 2 detects by the detection module 22 the angle of the input device 2 with respect to the vertical direction, and judges by the second controlling module 21 that whether the angle exceeds the threshold value, so as to generate the first state information indicating whether the angle of the input device 2 with respect to the vertical direction exceeds the threshold value, and finally transmits the first state information to the information processing device 1 by the second communication module 23. In this case, step S11 includes steps of judging that the information processing device 1 satisfies the second predetermined condition in case where the first state information indicates that the angle of input device with respect to the vertical direction does not exceed the threshold value, judging that the information processing device 1 does not satisfy the second predetermined condition in case where the first state information indicates that the angle of input device with respect to the vertical direction exceeds the threshold value.

Furthermore, particularly, step S11 includes steps of judging the position relationship of the input device 2 with respect to the information processing device 1 by the first controlling module 11, and judging whether the information processing device 1 satisfies the second predetermined condition based on the position relationship. Here, in the information processing device 1, the position relationship of the information processing device 1 with respect to the input device 2 can be judged or calculated by any module (such as image acquisition module, sensing module) with any method, as long as the obtained position relationship can be used to the process of judging whether the information processing device 2 satisfies the second predetermined condition.

For example, in the second embodiment, the input device 2 further includes a sensed component 25, the position of which in the input device 2 is different from that of the input component 24 in the input device 2. The sensing module 12 contained in the information processing device 1 can sense the position of the sensed component with respect to the sensing module within the sensing range (the distance between the input device and the sensing module is larger than or equal to 0 and smaller than the maximum sensing distance). Therefore, when the distance between the sensed component 25 of the input device 2 and the sensing module 12 satisfies the first predetermined condition which is larger than or equal to N and smaller than or equal to M, the sensing module 12 can sense the position of the sensed component 25 with respect to the sensing module 12. In this case, step S11 includes steps of judging whether the sensing module 12 further senses the position of the sensed component 25 with respect to the sensing module 12 in case where the distance between the input component 24 and the sensing module 12 satisfies the first predetermined condition, and judging that the information processing device 1 satisfies the second predetermined condition in case where the sensing module 12 does not sense the position of the sensed component 25 with respect to the sensing module 12; and judging that the information processing device 1 does not satisfy the second predetermined condition in case where the sensing module 12 further senses the position of the sensed component 25 with respect to the sensing module 12.

For still another example, in the third embodiment, the information processing device 1 includes an acquisition module, and the acquisition module at least acquires for input device 2 so as to generate acquisition information for computing the position relationship of the input device 2 with respect to the information processing device 1. In this case, step S11 includes steps of at least acquiring for the input device 2 by the acquisition module so as to generate the acquisition information, computing the position relationship of the input device 2 with respect to the information processing device 1 based on the first acquisition information, and judging whether the information processing device 1 satisfies the second predetermined condition based on the position relationship.

After that, when it is judged in step S11 that the information processing device satisfies the second predetermined condition, the input operation corresponding to the position of the input component of the input device with respect to the sensing module is responded (step S12). If it is judged in step S11 that the information processing device does not satisfies the second predetermined condition, the input operation corresponding to the position of the input component of the input device with respect to the sensing module is not responded (step S13). Here, as described above, "responding to" the input operation corresponding to the position of the input component of the input device with respect to the sensing module means: the information is processed in the information processing device with the position information of the input component with respect to the sensing module.

Further, the input component of the input device can be made of materials which can be sensed by the sensing module, so that the position of the input component with respect to the sensing module can be sensed by the sensing module of the information processing device. However, the input component can also be configured such that the signal is transmitted through the transmitting module contained in the input device, thus the sensing module of the information processing device can sense the position of the input component with respect to the sensing module. In case where the input device is configured such that the signal is transmitted through the transmitting module, if no signal is transmitted by the transmitting module, the sensing module of the information processing device cannot sense the position of the input component with respect to the input component 24.

Figure 4:
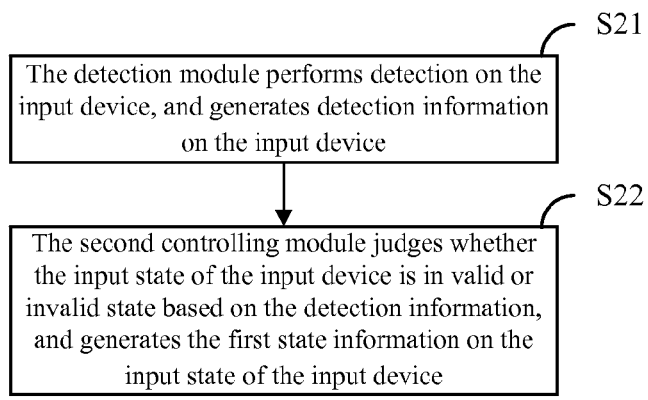
FIG. 4 is a flowchart showing an input controlling method according to the present invention.

Hereinafter, an input controlling method applied to the input device of the invention will be explained with reference to FIG. 4. FIG. 4 is a flowchart showing steps of the input controlling method applied to the input device of the invention. The input device can perform input operation on the information processing device, and the information processing device can respond to the input operation of the input device. The input device includes an input component located at end portion thereof, a detection module and a second controlling module, and the information processing device includes a sensing module. The sensing module can sense the position of the input component with respect to the sensing module within the sensing range (the distance between the input device and the sensing module is larger than or equal to 0 and smaller than maximum sensing distance). Therefore, when the distance between the input component of the input device and the sensing module satisfies the first predetermined condition which is larger than or equal to N and smaller than or equal to M, the sensing module can sense the position of the input component with respect to the sensing module.

First, in step S21, the detection module performs detection on the input device, and generates detection information concerning the input device.

For example, in the first and fourth embodiments, the detection module 22 detects whether the input device 2 is held through one or more touches sensors, and generates the detection information on whether the input device is held. Alternatively, the detection module 22 detects angle of the input device 2 with respect to the vertical direction through accelerate sensor as the detection information concerning the input device.

After that, in step S22, the second controlling module judges whether the input state of the input device is in valid state or invalid state based on the detection information, and generates the first state information on the input state of the input device. Herein, the first state information is used to judge that whether the information processing device responds to the input operation of the input device.

For example, in the first and fourth embodiment, the second controlling module 21 judges whether the input device 2 is held based on the detection information on whether the input device 2 is held, and generates the first state information indicating whether the input device 2 is held. Alternatively, the second controlling module 21 judges whether the angle of the input device 2 with respect to the vertical direction exceeds the threshold value, and generates the first state information indicating whether the angle of the input device 2 with respect to the vertical direction exceeds the threshold value.

The first state information can represent any meaning, as long as it can represent whether the input state of the input device is in valid state or invalid state, and therefore, it is possible to perform detection on the input device by a suitable detection module, and to judge whether the input state of the input device is in valid state or invalid state by the second controlling module based on the detection information.

Further, as shown in the first embodiment, the input device 2 includes a second communication module 23, and transmits the first state information to the information processing device 1 through the second communication module 23. Therefore, in the input controlling method of the invention, it is possible to further include transmitting the generated first state information by the second communication module 23 to the information processing device 1.

It also may be as shown in the fourth embodiment, in the input device 2, the signal (such as infrared ray and the like) associated with the input operation of the input component 24 is transmitted through the transmitting module contained in the input device 2, so that the sensing module 12 of the information processing device 1 can sense the position of the input component 24 with respect to the sensing module 12. Therefore, in case where the sensing module of the information processing device 1 receives no signal from the transmitting module, the sensing module 12 cannot sense the position of the input component 24 with respect to the sensing module 12. Therefore, the input controlling method of the invention may further include steps of controlling, by the second controlling module 21, the transmitting module to be capable of transmitting signal associated with the input operation of the input component 24 in case where the first state information represents the input state of the input device 2 is in valid state, so that the sensing module 12 can sense the position of the input component 24 with respect to the sensing module 12; on the other hand, in case where the first state information represents the input state of the input device 2 is in invalid state, controlling the transmitting module to be not capable of transmitting the signal associated with the input operation of the input component 24, so that the sensing module 12 cannot sense the position of the input component 24 with respect to the sensing module 12.

Here, it is possible for the second controlling module 21 to control, by not supplying power to the transmitting module, the transmitting module to be not capable of transmitting the signal associated with the input operation of the input component 24. However, it is also possible for the second controlling module 21 to employ other methods to make the transmitting module fail to transmit the signal associated with the input operation of the input component 24.

In case where the information processing device supports the suspension operation function, the information processing method and the input controlling method according to the invention can decrease or eliminate the occurrence of situation where the input device such as stylus is triggered by mistake without affecting user's operation experience.

Those skilled in art should appreciate that, the respective units and steps described in conjunction with the embodiments of the present invention can be embodied in electronic hardware, computer software or combination of the both. And the software module can be placed into any kinds of computer memory media. To explicitly explain the interchangeability of the hardware and software, in the above explanation, the constitution and steps of the respective embodiments has been generally described in terms of function. Whether these functions are performed in hardware or software depends on a specific application and design constraint of the technical solution. Those skilled in art can realize the described functions with different methods with respect to each of specific applications, and this realization should not be considered as exceeding the scope of the invention.

Respective embodiments of the invention have been described in details hereinabove. However, those skilled in art should understand that various modification, combination or sub-combination can be made to these embodiments without departing from the principle and spirit of the present invention, and these modifications should be within the scope of the present invention.

The invention claimed is:

1. A data processing method for an information processing device including a sensing module which is capable of sensing a position of an input component of an input device with respect to the sensing module when the distance between the input component and the sensing module satisfies a first predetermined condition where the distance between the input component and the sensing module is larger than or equal to N and smaller than or equal to M, wherein the input component is located at an end portion of the input device, N and M are two different distances within sensing range of the sensing module, and N>0, the data processing method includes:

judging whether the information processing device satisfies a second predetermined condition when the distance between the input component and the sensing module satisfies the first predetermined condition;

responding to an input operation corresponding to the position of the input component with respect to the sensing module when the information processing device satisfies the second predetermined condition; and not responding to the input operation corresponding to the position of the input component with respect to the sensing module when the information processing device does not satisfy the second predetermined condition, detecting whether the information processing device satisfies the second predetermined condition includes judging by the information processing device, a position relationship between the input device and the information processing device and judging whether the information processing device satisfies the second predetermined condition based on the position relationship, wherein the input device includes a sensed component which is located in the input device at a different position from that of the input component in the input device;

the sensing module is capable of sensing the position of the sensed component with respect to the sensing module when the distance between the sensed component of the input device and sensing module satisfies the first predetermined condition; and judging whether the information processing device satisfies the second predetermined condition includes:

judging whether the position of the sensed component with respect to the sensing module is further sensed by the sensing module in case where the distance between the input component and the sensing module satisfies the first predetermined condition;

judging the information processing device satisfies the second predetermined condition in case where the position of the sensed component with respect to the sensing module is not sensed by the sensing module; and judging the information processing device does not satisfy the second predetermined condition in case where the position of the sensed component with respect to the sensing module is further sensed by the sensing module.

2. The data processing method according to claim 1, wherein the information processing device further comprises a first communication module which is capable of receiving a first state information on the input device from the input device, judging whether the information processing device satisfies the second predetermined condition including:

receiving by the first communication module the first state information on the input device from the input device; and judging whether the information processing device satisfies the second predetermined condition based on the first state information.

3. The data processing method according to claim 2, wherein detecting, in the input device, whether the input device is held and generates a first detection information associated with whether the input device is held, and judging whether the input device is held based on the first detection information, so as to generate the first state information representing whether the input device is held, judging whether the information processing device satisfies the second predetermined condition including:

judging that the information processing device satisfies the second predetermined condition in case where the first state information represents the input device is held;

judging that the information processing device does not satisfy the second predetermined condition in case where the first state information represents that the input device is not held.

4. The data processing method according to claim 2, wherein detecting in the input device, angle of the input device with respect to vertical direction, and generating by judging whether the angle exceeds a threshold value, the first state information representing whether the angle of the input device with respect to the vertical direction exceeds the threshold value, judging whether the information processing device satisfies the second predetermined condition including:

judging the information processing device satisfies the second predetermined condition in case where the first state information represents that the angle of the input device with respect to the vertical direction does not exceed the threshold value; and judging the information processing device does not satisfy the second predetermined condition in case where the first state information represents that the angle of the input device with respect to the vertical direction exceeds the threshold value.

5. The data processing method according to claim 1, wherein the information processing device further includes an acquisition module which acquires at least for the input device, so as to generate a first acquisition information for computing the position relationship between the input device and the information processing device;

judging whether the information processing device satisfies the second predetermined condition includes:

generating the first acquisition information through acquiring at least for the input device by the acquisition module;

computing the position relationship between the input device and the information processing device based on the first acquisition information; and judging whether the information processing device satisfies the second predetermined condition based on the position relationship.

6. An input controlling method for an input device capable of performing an input operation on an information processing device, the information processing device being capable of responding to the input operation of the input device, wherein the input device includes an input component located at an end portion thereof, and the information processing device includes a sensing module which is capable of sensing a position of the input component with respect to the sensing module when the distance between the input component and the sensing module satisfies a first predetermined condition where the distance between the input component and the sensing module is larger than or equal to N and smaller than or equal to M, wherein N and M are two different distances within sensing range of the sensing module, and N>0, the input controlling method including:

performing detection on the input device, and generating detection information on the input device; and judging whether an input state of the input device is in valid state or invalid state based on the detection information, and generating the first state information on the input state of the input device, wherein the first state information is used for judging whether the information processing device responds to the input operation of the input device, wherein the input device includes a sensed component that is located in the input device at a different position from that of the input component in the input device;

the sensing module is capable of sensing the position of the sensed component with respect to the sensing module when the distance between the sensed component of the input device and sensing module satisfies the first predetermined condition; and judging whether an input state of the input device is in valid state or invalid state based on the detection information includes:

judging whether the position of the sensed component with respect to the sensing module is further sensed by the sensing module in case where the distance between the input component and the sensing module satisfies the first predetermined condition;

judging an input state of the input device is in valid state in case where the position of the sensed component with respect to the sensing module is not sensed by the sensing module; and judging an input state of the input device is in invalid state in case where the position of the sensed component with respect to the sensing module is further sensed by the sensing module.

7. An information processing device capable of responding to an input operation of an input device, the input device including an input component located at an end portion thereof, the information processing device including:

a sensing module which is capable of sensing a position of the input component with respect to the sensing module when the distance between the input component of the input device and the sensing module satisfies a first predetermined condition where the distance between the input component and the sensing module is larger than or equal to N and smaller than or equal to M, wherein N and M are two different distances within sensing range of the sensing module, and N>0; and a first controlling module judging whether the information processing device satisfies a second predetermined condition when the distance between the input component and the sensing module satisfies the first predetermined condition, responding to an input operation corresponding to the position of the input component with respect to the sensing module when the information processing device satisfies the second predetermined condition, and not responding to the input operation corresponding to the position of the input component with respect to the sensing module when the information processing device does not satisfy the second predetermined condition, wherein the first controlling module judges a position relationship between the input device and the information processing device, and judges whether the information processing device satisfies the second predetermined condition based on the position relationship, the input device includes a sensed component which is located in the input device at a different position from that of the input component in the input device;

the sensing module is capable of sensing the position of the sensed component with respect to the sensing module when the distance between the sensed component of the input device and sensing module satisfies the first predetermined condition; and the first controlling module judges whether the position of the sensed component with respect to the sensing module is further sensed by the sensing module when the distance between the input component and the sensing module satisfies the first predetermined condition, judges the information processing device satisfies the second predetermined condition when the position of the sensed component with respect to the sensing module is not sensed by the sensing module, and judges the information processing device does not satisfy the second predetermined condition when the position of the sensed component with respect to the sensing module is further sensed by the sensing module.

8. The information processing device according to claim 7, further comprising a first communication module which is capable of receiving first state information on the input device from the input device, judging by the first controlling module whether the information processing device satisfies the second predetermined condition based on the first state information received by the first communication module.

9. The information processing device according to claim 8, wherein in the input device, whether the input device is held is detected, and a first detection information associated with whether the input device is held is generated, and whether the input device is held is judged based on the first detection information, so as to generate the first state information representing whether the input device is held;

the first controlling module judges that the information processing device satisfies the second predetermined condition in case where the first state information represents the input device is held, and judges that the information processing device does not satisfy the second predetermined condition in case where the first state information represents that the input device is not held.

10. The information processing device according to claim 8, wherein in the input device, angle of the input device with respect to vertical direction is detected, whether the angle exceeds a threshold value is judged, and the first state information representing whether the angle of the input device with respect to the vertical direction exceeds the threshold value is generated;

the first controlling module judges that the information processing device satisfies the second predetermined condition in case where the first state information represents that the angle of the input device with respect to the vertical direction does not exceed the threshold value, and judges that the information processing device does not satisfy the second predetermined condition in case where the first state information represents that the angle of the input device with respect to the vertical direction exceeds the threshold value.

11. The information processing device according to claim 7, further comprising:

an acquisition module which acquires at least for the input device, so as to generate a first acquisition information for computing the position relationship between the input device and the information processing device; and the first controlling module computes the position relationship between the input device and the information processing device based on the first acquisition information, and judges whether the information processing device satisfies the second predetermined condition based on the position relationship.

* * * * *